United States Patent
Rutherford

[15] 3,680,295
[45] Aug. 1, 1972

[54] SAFETY ROTARY MOWER
[72] Inventor: Harry T. Rutherford, 1123 Wood Heights Ave., Baltimore, Md. 21211
[22] Filed: Aug. 20, 1971
[21] Appl. No.: 173,469

[52] U.S. Cl. .................56/320.2, 56/13.4, 56/255
[51] Int. Cl. ...........................................A01d 35/26
[58] Field of Search.........56/320.1, 320.2, 255, 17.5, 56/13.3, 13.4, 16.6, 17.2, 13.8, 12.2

[56] References Cited

UNITED STATES PATENTS

| | | | |
|---|---|---|---|
| 2,578,880 | 12/1951 | Doyle | 56/17.2 |
| 2,708,334 | 5/1955 | Coners | 56/320.2 |
| 2,719,396 | 10/1955 | Morris et al. | 56/12.2 |
| 2,734,327 | 2/1956 | Whitney | 56/13.8 |
| 2,806,339 | 9/1957 | Whitney | 56/16.6 |
| 2,807,126 | 9/1957 | Bennett | 56/13.4 |
| 2,983,096 | 5/1961 | Phelps | 56/255 |
| 2,990,666 | 7/1961 | Blume | 56/13.4 |
| 3,093,947 | 6/1963 | Whitman | 56/17.2 |
| 3,496,707 | 2/1970 | Kobey | 56/17.5 |
| 3,601,960 | 8/1971 | Buechler | 56/320.2 |

*Primary Examiner*—Russell R. Kinsey
*Attorney*—John F. McClellan, Sr.

[57] ABSTRACT

A rotary lawn mower having a ring-shaped blade shroud in the form of a flat plate affixed at the bottom of the deck below the blade concentric with the axis of rotation, with the inner diameter being less than the blade length and the outer diameter extending beyond the housing; a diagonal plate at the exit chute extends inward and forward above the blade; in various embodiments the shroud has diametrically opposite notches in the inner periphery shielded by fore-and-aft skids, a portion of the front of the shroud and deck are removable as a unit for replacement by a modified deck exposing the blade in front, a through-axle bell crank wheel mounting system is provided for height adjustment, and a special blade configuration is disclosed.

14 Claims, 9 Drawing Figures

PATENTED AUG 1 1972 3,680,295

INVENTOR.
HARRY T. RUTHERFORD
BY
John F. McClellan Sr.
ATTORNEY

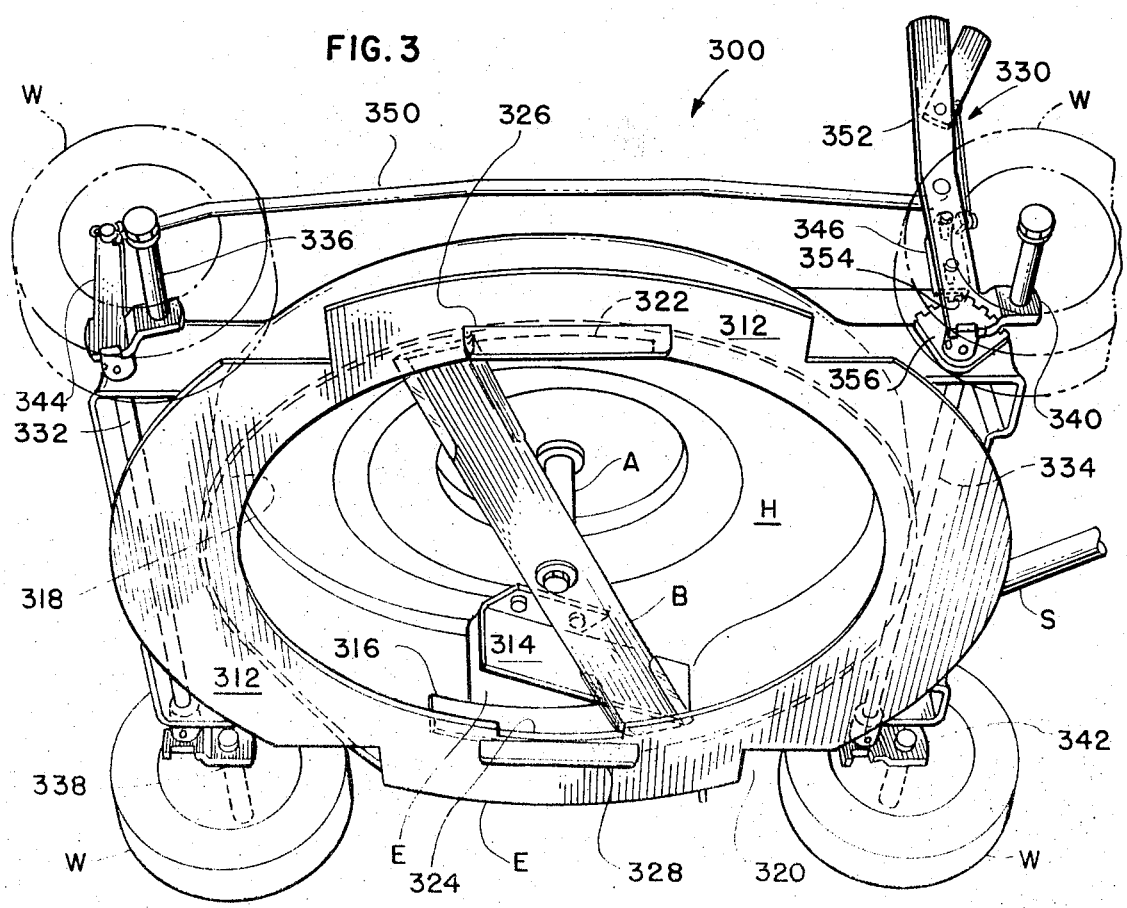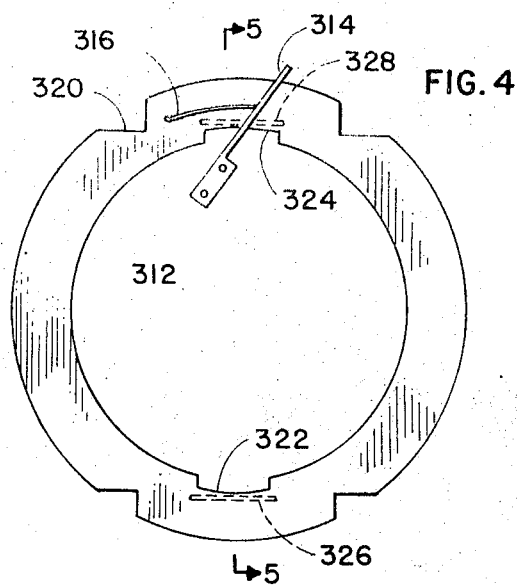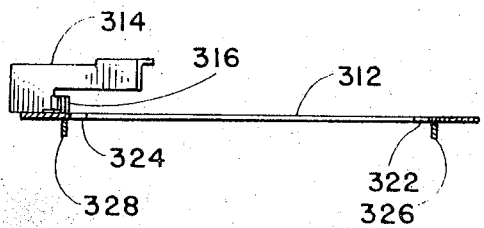
INVENTOR.
HARRY T. RUTHERFORD

INVENTOR.
HARRY T. RUTHERFORD

SAFETY ROTARY MOWER

This invention relates generally to lawn mowers and specifically to rotary lawn mowers in which a propeller-type cutting blade rotates about a vertical axis.

Even though the superior features of the so-called "rotary" lawn mower have forced public acceptance of this type mower almost to the exclusion of other mowers, the frequency of serious injury is apparently leading toward Federal safety regulations which could seriously affect the industry if injuries are not largely eliminated.

In the prior art, many safety features have been suggested, but to the present have not substantially affected the injury rate.

A two fold object of the present invention is to provide a rotary mower device which will largely eliminate serious injuries and which will at the same time increase the cutting efficiency of rotary mowers by scientifically redefining airflow into and out of mowers to improve the mowing of grass.

Other objects of the invention are:

to provide a device as described which is adaptable for installation on existing mowers as well as for installation by original equipment manufacturers;

to provide a device as described which makes mowers easier to operate in many circumstances, but which adds very little to weight and complexity of mowers;

to provide a device as described which produces a full width sharply defined cut without scalping or clogging;

to provide a device as described which removes clippings in a superior manner, which is adaptable for cutting high, heavy weed growth safely, which has a novel height adjustment, and which is easy and economical to manufacture, store, ship, sell and install, requiring a minimum of material and fabrication.

In an embodiment the invention includes a flat, circular shaped shroud ring for installation under a rotary mower housing below the blade, with a diagonal plate above the blade, a detachable portion of the deck and shroud for weed cutting, a weed-cutting shield, and a novel, strong, precise height adjustment which cooperates with the shroud for better airflow control below the shroud, and which has a through-axle adapted to serve as a safety bar during weed cutting.

The above and other advantages and objects of the present invention will become more readily apparent on examination of the following description, including the drawings, in which:

FIG. 3 is a quartering perspective of the underside of a portion of a mower;

FIG. 4 is a plan view of details of a mower shroud and deflector plate;

FIG. 5 is a side elevation in partial section, taken at 5—5, FIG. 4.

In the drawings, like numbers indicate like parts.

Figure 1:
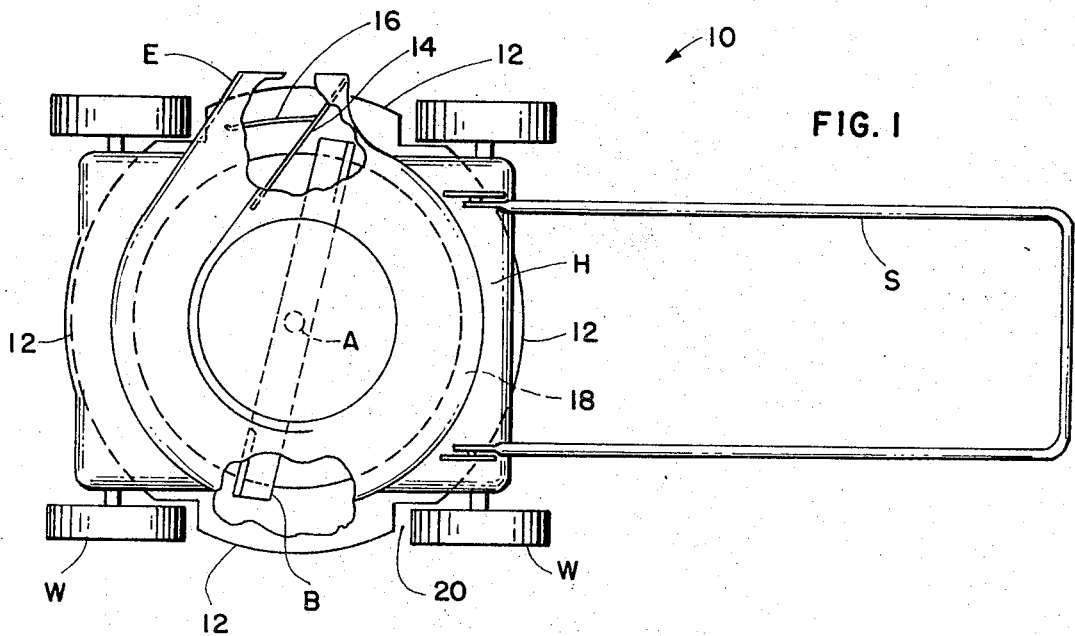
FIG. 1 is a plan view, partly broken away, of features of a rotary mower.
Figure 2:
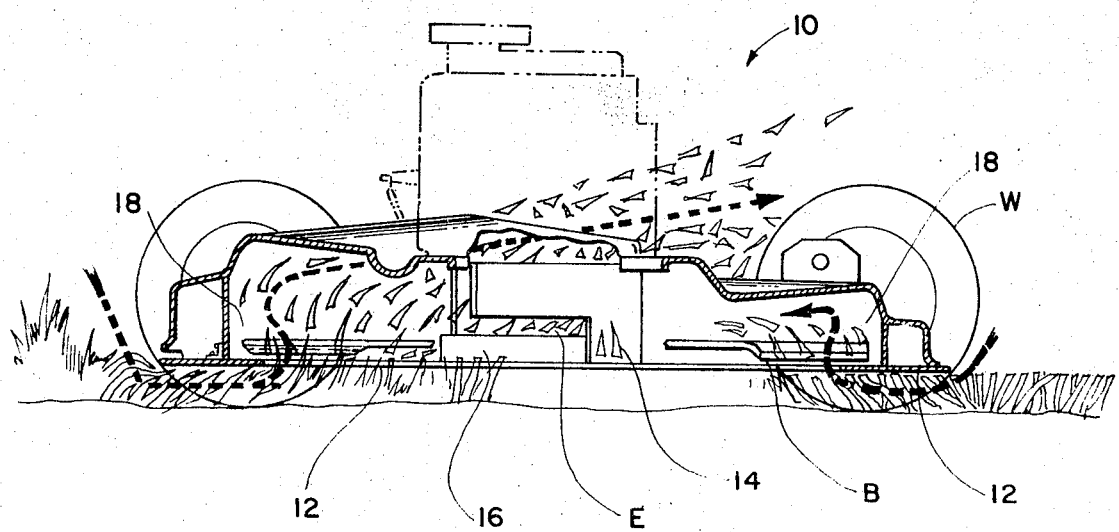
FIG. 2 is a side elevation in partial section of features of a mower cutting grass.

FIGS. 1 and 2 show, in plan and side elevation section respectively, details of a mower assembly 10 (with the motor removed for clarity in FIG. 1) illustrating incorporation of features of this invention. The mower is of overall generally accepted design found in good quality lawn mowers. It includes as conventional features a steering handle S, a housing H including a side-exhaust chute E for clippings, wheels W, and combination cutting and air pumping blade B. Rotation of the blade is conventional, being clockwise in the Figure.

The two novel features illustrated in FIG. 1 are the blade shroud 12 and the diagonal plate 14, including a guard plate 16 integral with the diagonal plate.

The shroud is a flat ring which is affixed by screws or by welding or otherwise to the underside of the housing H, immediately below the blade. The shroud is circular, and both the inner and outer perimeters are concentric with the axis A of the blade.

The inner perimeter is made less in diameter than the length of the blade B, so that the tips of the blade overlap the shroud and are in very close proximity to it. The outer diameter of the shroud is made substantially greater than the inner diameter so that the ring measures several inches across, and protrudes from the housing.

New and valuable improvements result from this unique arrangement.

First, this feature protects the operator from harm. The preferred measurement across the edge of the ring (the difference in radii between the inner and outer perimeters) is made to be at least 3 ½ and preferably 4 inches. This dimension is greater than the length of the shod human foot from the top of the longest toe to the rise above the instep. Consequently, on all sides of the mower a human foot will jam against the rim of the shroud before the toe reaches a position where it can be damaged.

Even if the foot is deliberately forced into contact with the blade by lifting the mower enough to clear the rise above the instep and tipping the toe upwards, the damage done on contact with the blade shank will be far less than it would be with the exposed tip of a blade. These same safety considerations extend to other portions of the human body, particularly to the hands. Additionally, it will be seen that the tips of the blades are not available to launch flying debris through the air, like golf clubs striking golf balls. Instead, rocks, glass, pieces of metal, bones and other potential projectiles are struck only by the shank of the blade, and are trapped above or, in some cases below, the shroud when struck.

Secondly, the flat plate shroud forms an annular chamber 18 with the interior circumference of the housing H, in which the tips of the blade operate. These blade tips being canted to pump air and protected by the shroud from fouling by upstanding grass, are aerodynamically more efficient than otherwise. Operating in circular chamber 18 with the close clearance between them and the shroud acting as a dynamic seal, they produce on the underside of the tips a large pressure drop, and a correspondingly large pressure increase above the blades. These pressure effects are enhanced by the diagonal plate 14 which acts as a stripper plate.

In length, the diagonal plate 14 extends from the trailing side of the exhaust chute inward and toward the front of the mower diagonally counter to the blade rotation in a direction which, if extended, would be tangent to a circle described by about the inner three-fifths of the blade radius. Approximately the outer two-fi-fths of the blade radius pass under it. In height, at the inner end, the plate seals at the top against the underpart of the deck of the mower and just clears the blade beneath; outboard of the blade it is the same height as the chute E. In operation, as the blade tip passes closely beneath the plate 14, the charge of high pressure air, including clippings entrained in it, is "stripped" away from the blade by the diagonal plate and deflected out through the chute. This immediately and efficiently renews the upward pumping cycle at that blade tip.

Guard plate 16 extends forwardly across the lower part of chute E in the plane of the blade to prevent injury through contact with the end of the blade and with debris thrown in the plane of the blade.

A very important contributing factor to the grass cutting efficiency of this design should be noted at this point. The broken, heavy lines in FIG. 2 indicate this feature. The large flat-plate area of the ring 14, close to and parallel with the ground, tunnels the incoming air between the ring and the ground. The draft of air acts on the grass over a long parallel sweep. This violently grooms the grass more-or-less parallel, bends the grass toward the central opening, and holds it upright in the updraft at the central opening so that the blade can clip the grass cleanly from the top down.

The grass grooming action of this extended air tunnel formed with the ground contrasts with the hit-or-miss circulation at the skirt of ordinary mowers which twists the grass, leading to tearing, clogging and choking, especially with wet grass. As noted, the grass is progressively cut from the top down, rather than being chopped in the middle by blade tips. Almost all rotary mowers have more than enough power to mow and mulch simultaneously in this manner, but clogging and other results of deficient design have prevented this in the prior art.

The mower of this invention is easy to push, even in tall grass, across which the flat plate tends to glide when set at the proper height. Scalping is practically impossible, since the cutting portions of the blade are so closely guarded. Rocks and other obstacles seldom reach the cutting portions of the blade and blades require less sharpening than with other mowers. When sharpening is required, the blade is loosened in the ordinary way and easily passed out through the chute.

Because the tips are protected, shocks on meeting obstacles are reduced, and fewer broken shafts and other engine parts result.

Although the periphery of the shroud has been described as circular, wheel cut-outs may be provided in the periphery for compactness, as at 20, FIG. 1.

The wheels safely block hand or foot access to the blade at the cut outs, and the air-channeling effects of the wheel are present regardless of the cut outs.

FIGS. 3, 4 and 5 illustrate respectively a further embodiment 300 of the invention and details of the embodiment. In this embodiment the basic mower frame is as before, consisting of a housing H, with blade B, blade axis A, wheels W, steering handle S, and exhaust chute E.

Also shown in this embodiment are shroud 312, plate 314, guard 316, chamber 318, and wheel cut-outs 320. (In the drawing the wheels are small and the cutouts exaggerated for exposition). However, new features are added, making possible a full-width cut with an especially sharply defined swath edge, even though the blade tips are kept inaccessible to fingers and toes of people around the mower, and even though the improved grass-preparing and disposing features previously described are fully preserved.

The new features in FIGS. 3-5 are notches 322, 324, positioned diametrically across from each other on the sides of the shroud 312, and notch-guarding skids 326, 328, which respectively extend down from the shroud outboard of the notches.

The notches 322, 324 are formed in the inner perimeter of the shroud a radial distance on each side sufficient to expose the entire blade tips, and a circumferential distance of at least a blade width, preferably at least 2 or 3 inches.

Guarding the ends of the blades exposed at the notches from accidental contact are the two side plates 326, 328 or skids since they project downward from sides of the shroud and extend in a fore-and-aft direction. The skids are preferably substantially longer than the notches, preferably extend downward more than a finger thickness, and may have bevelled or rounded corners for easy riding over obstacles. Since raising the mower by pivoting on the rear wheels is necessary to turn the mower, the skids are also raised during turning and present no problem.

As shown in FIGS. 3, 4 and 5, the skids are preferably straight in plan view to move smoothly across crowned lawn areas without scuffing. FIG. 4 indicates in plan, and FIG. 5 in section taken at 5—5 in FIG. 4, the relation of the notches, skids, and diagonal plate member 314, 316.

The skids serve not only as safety devices but also retard inward airflow at the sides so that the grass fed to the blade by the airflow comes from in front of or from behind the slots, not from outboard. This provision sharply defines the edges of the swath cut, making the mower particularly well-suited for use in dim light, since it is both safe and leaves a cut edge which is easy to follow, even in thin grass. The skids also tend to prevent injury to the blade and shaft when the mower is accidentally rolled off the corners of walkways and the like.

As noted, the shroud should be the same distance from the ground all around, with the exact distance adjusted for best results depending on the type lawn growth being cut. FIG. 3 shows a novel single-point-control height adjuster 330 for use in conjunction with the shroud equipped mowers disclosed.

The adjuster includes similar front and rear axles 332 and 334 which are journalled in the housing H ahead of and behind the blade sweep. Each axle end mounts a wheel W on a trailing link offset stub-axle assembly, 336, 338, 340, 342 respectively. Each of the trailing links 336, 340 on the side away from the chute (the left side normally) has a bell crank arm 344, 346. The bellcrank arms are connected by a tie rod 350, and the rear arm additionally includes as an integral part a ratchet equipped handle 352. The ratchet 354, when released, engages a sector gear 356 affixed to the housing to set the height of the wheels.

By means of this adjustment the shrouded mower assembly can easily be raised and lowered for best results, precisely, speedily, and without danger.

The shroud can be installed and removed without interference with the wheel mountings, and the wheels are simply and securely mounted to the housing, even to housings constructed of thin material.

Figure 6:
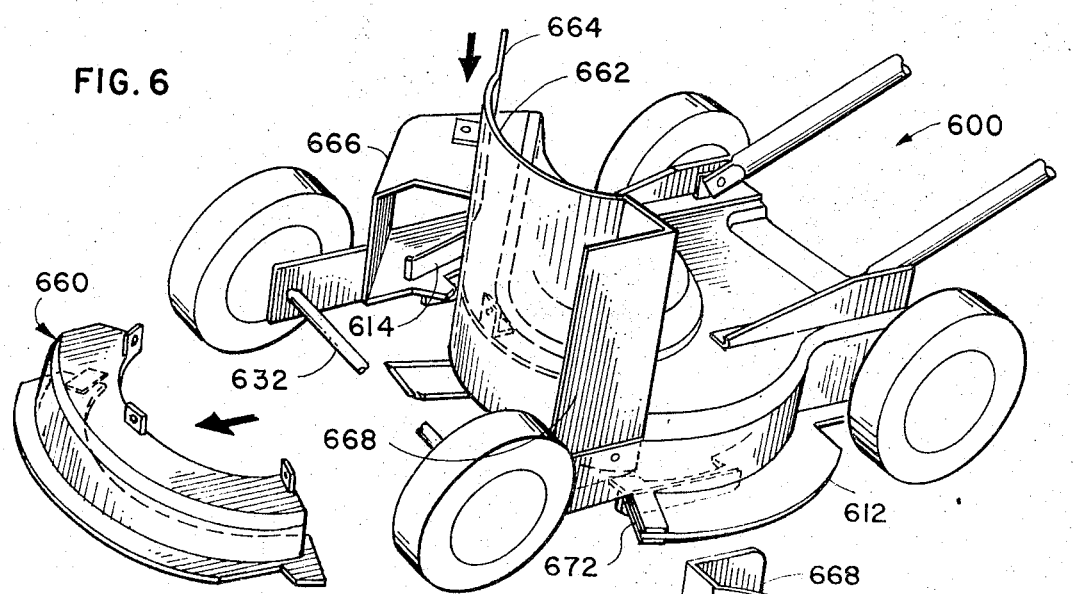
FIGS. 6 and 7 are perspective views of details of a mower embodiment.
Figure 7:
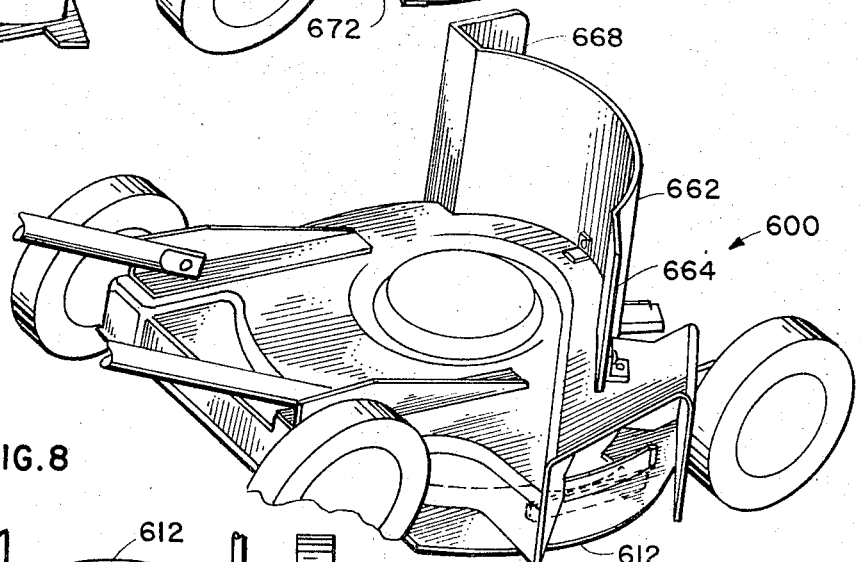
Figure 8:
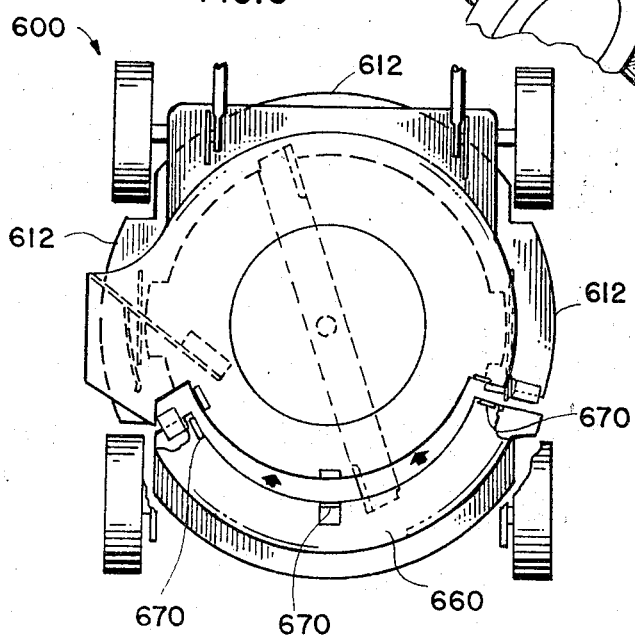
FIG. 8 is a plan view illustrating details of a mower embodiment.

FIGS. 6, 7 and 8 illustrate yet a further embodiment 600 of the device in which a portion of the front deck and shroud are removable as a unit and are replaceable by a shield, adapting the mower for cutting and mulching heavy, tall weeds.

For clarity, the motor is omitted in these Figures, but protection of the motor and operator from flying mulch and other debris is one of the principal objects of this embodiment.

FIG. 6 shows the portion 660 removed. This consists of the forward part of the deck back to the engine mounting approximately, plus the forward 1302 arc of the shroud approximately, as indicated in plan in FIG. 8.

Removal of this unit allows installation of the weed shield 662, FIGS. 6 and 7. The weed shield is vertical, is higher than the engine, and curves around the front of the engine. It terminates on the right with a rearwardly angled edge 664 over the outboard portion 666 of the chute which remains in place as a square tunnel. On the left the weed shield terminates in a forwardly turned edge 668 just inboard of the left front wheel. The shield protects both the engine and the operator from material lifted by the blade, but leaves the front of the mower open for visibility and to avoid clogging.

The remaining, horse-shoe-shaped portion 612 of the shroud protects the operator's feet from material drawn into the front of the housing by the blade, as well as controlling circulation beneath the mower.

Attachment of the weed shield is by some of the same screws 670 (FIG. 8) used to secure the detached portion of housing and shroud on reassembly. The shroud is additionally secured together on reassembly by a dovetail overlap 672, FIG. 6, in the preferred embodiment.

In the weedcutting embodiment the height adjustment described in reference to FIG. 3 and indicated here only by the front through-axle 632 is additionally useful, if used. The front axle serves as a bumper ahead of the bare blade to prevent damage when run into obstacles.

In this embodiment it will be noted that plate 614 remains in place in the remaining portion of the chute and cleans the blade as it passes.

Figure 9:
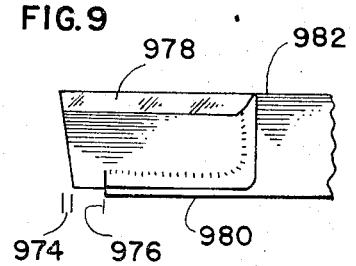
FIG. 9 is a blade detail.

FIG. 9 is a detail of the end of a novel blade 982, both ends of which are the same as shown. The blade modified by this invention is of the standard type having forged and ground ends, producing a chamfered, ground, cutting-edge 978 along a portion of the outer radius of the blade and a raised, airfoil-type trailing edge 980 co-extensive in length with the cutting-edge.

The modification consists in: (a) straight-bevelling the blade tip in plan as indicated by the reference numeral 984 and the spacing lines with the deeper part of the bevel at the trailing edge, and in (b) grinding off the terminal portion of the raised edge 980 to a depth which fairs-in the ground portion with the upper surface of the blade at that point and radially inward a distance equal to a point where the blade and shroud overlap cease, indicated by reference numeral 976.

This prevents the blade tip from fouling even in the heaviest cutting, when used with the embodiment of FIGS. 6, 7, and 8, the open-front weed cutting embodiment.

Obviously, many modifications and variations of the present invention are possible in light of the above teachings. It is, therefore, to be understood that within the scope of the appended claims the invention may be practiced otherwise than as specifically described.

What is claimed and desired to be obtained by United States Letters Patent is:

1. In a rotary mower having a propeller type blade rotating in a horizontal plane in a wheel supported housing open at the bottom, the improvement comprising: a ring-shaped substantially flat shroud substantially co-axial with the blade and forming an annular chamber for the blade with the bottom periphery of the housing, the inner diameter of the shroud being less than the blade length, and the outer diameter of the shroud protruding beyond the housing, said shroud forming with the ground during mowing a tunnel having a radial extend which is substantially longer than the mowing extent whereby the blade tips are made inaccessible to accidental contact by an operator during normal operation of the mower, and whereby grass and the like is more readily aligned and drawn into the blade by passage of air through the tunnel.

2. In a rotary mower as recited in claim 1, the radial dimension between the inner radius and outer radius of the shroud being nominally greater than the lengths of human digits.

3. In a rotary mower as recited in claim 1, wherein said mower has an exhaust chute in the housing and a deck on the housing, the additional improvement comprising: a plate extending downwardly from the underside of the housing to a position just clearing the blade, and extending inwardly and diagonally in opposition to the direction of blade rotation for a portion of the radius of the blade, whereby the blade is adapted to be cleared of load on passing between the plate and the shroud.

4. In a rotary mower as recited in claim 3, said plate having a portion extending across the exhaust chute in the plane of blade travel, thereby preventing the blade from ejecting foreign objects in the plane of blade travel.

5. In a rotary mower as recited in claim 1, each side of the shroud having a recess adapted to expose the blade tips, thereby adapting the mower to produce a full width cut; and a flange extending downward from the shroud and fore-and-aft with respect to the mower outboard of each recess, thereby shielding the recesses, retarding airflow radially inward to said recesses, adapting the mower for producing a sharp boundary on the swath mowed.

6. In a rotary mower as recited in claim 1, the shroud having notch adapted to receive a portion of a said wheel.

7. In a rotary mower as recited in claim 1, the shroud being detachable.

8. In a rotary mower as recited in claim 1, the additional improvement comprising a one-point control for adjusting the height of said tunnel, including a pair of bellcrank-linked axles passing through portions of the housing, said axles having trailing-link offset stub axles, and means for actuating the bell-cranks together, thereby maintaining said shroud parallel with the ground at all times during height adjustment and operation.

9. In a rotary mower as recited in claim 1, a forward portion of the housing and shroud being detachable, exposing the blade for weed cutting and the like, and a vertical shield for attachment to the housing at the front edge of the position from which the forward portion is detachable.

10. In a rotary mower as recited in claim 9, the detachable portion of the shroud comprising an arc exceeding a right angle subtended at the blade axis, and having a dovetail portion adapted for securance of the detachable portion.

11. In a rotary mower as recited in claim 9, the portions of the propeller-type blade overlapping the housing being ground flat and parallel behind the cutting edge as viewed in end elevation, and each blade tip being flat bevelled on the end from the cutting edge back with the greatest depth of the bevel being at the trailing edge, as viewed in plan.

12. In a rotary mower as recited in claim 9, a one-point control for adjusting the height of said tunnel, including a front axle, a back axle, a bellcrank link between the front and back axles, a trailing-link offset stub axle mounting a wheel at each end of the front and back axles, and means for placing the bellcrank link in various settings, thereby maintaining said shroud parallel with the ground at all said height adjustments.

13. In a rotary mower as recited in claim 1, the portions of the blade overlapping the shroud being closely proximate the shroud, thereby forming a dynamic air-seal therebetween.

14. In a rotary mower having a propeller type blade rotating in a horizontal plane in a wheel supported housing open at the bottom, the improvement comprising: a ring-shaped substantially flat shroud substantially co-axial with the blade and forming an annular chamber for the blade with the bottom periphery of the housing, the inner diameter of the shroud being less than the blade length, each side of the shroud having a recess adapted to expose the blade tips, thereby adapting the mower to produce a full width cut, and a flange extending downward from the shroud and fore-and-aft with respect to the mower outboard of each recess, thereby shielding the recesses, retarding airflow radially inward to said recesses and adapting the mower for producing a sharp boundry on the swath mowed, said shroud forming with the ground during mowing a tunnel having a radial extent which is substantially longer than the mower height, whereby the blade tips are made inaccessible to accidental contact by an operator during normal operation of the mower, and whereby grass and the like is more readily aligned and drawn into the blades by passage of air through the tunnel.

* * * * *

UNITED STATES PATENT OFFICE
CERTIFICATE OF CORRECTION

Patent No. 3,680,295          Dated August 1, 1972

Inventor(s) Harry T. Rutherford

It is certified that error appears in the above-identified patent and that said Letters Patent are hereby corrected as shown below:

Claim 1, line 11, "extend" should read -- extent --.

Claim 1, line 12, "extent" should read -- height --.

Signed and sealed this 29th day of January 1974.

(SEAL)
Attest:

EDWARD M. FLETCHER, JR.          RENE D. TEGTMEYER
Attesting Officer                Acting Commissioner of Patents